June 26, 1934.  W. H. YANDELL  1,964,492
ROTARY PUMP OR POWER TRANSMISSION MECHANISM
Filed July 29, 1932  2 Sheets-Sheet 1

W. H. YANDELL INVENTOR

BY
Merrill M. Blackburn
ATTORNEY

June 26, 1934.   W. H. YANDELL   1,964,492
ROTARY PUMP OR POWER TRANSMISSION MECHANISM
Filed July 29, 1932   2 Sheets-Sheet 2

W. H. YANDELL   INVENTOR

BY
Merrill M. Blackburn
ATTORNEY

Patented June 26, 1934

1,964,492

UNITED STATES PATENT OFFICE 1,964,492

ROTARY PUMP OR POWER TRANSMISSION MECHANISM

William H. Yandell, Berwyn, Ill.

Application July 29, 1932, Serial No. 626,163

1 Claim. (Cl. 103—136)

The present invention pertains to a mechanism which may be used either as a rotary pump or a power transmission mechanism and comprises among its objects to provide an improved structure of the nature indicated; to provide a structure of the character indicated which is substantially noiseless in its operation; to provide a structure of the character indicated which is powerful; to provide a structure of the character indicated in which there is a minimum of leakage; to provide a structure of the character indicated in which the machine work is reduced to the simplest of operations; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof,

Figure 1:
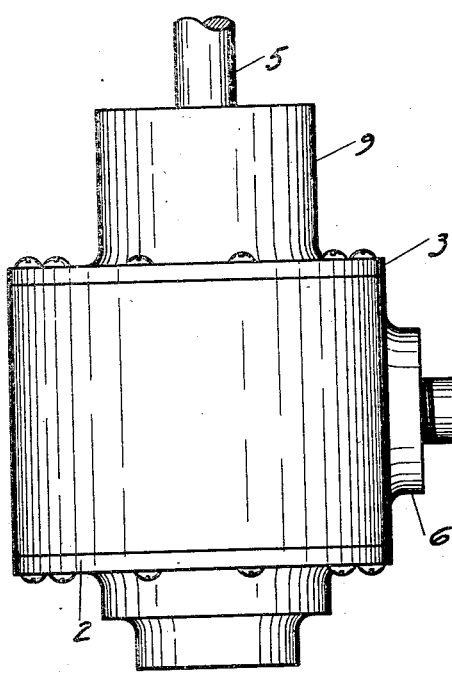
Fig. 1 is an elevation of a structure embodying my present invention.

Reference will now be made in greater detail to the annexed drawings for a more complete description of this construction. The casing of this device comprises a substantially cylindrical body member 1 having a bottom 2 and a top 3. The bottom 2 is secured to member 1 in any suitable manner, as by means of screws, and has a boss 4 projecting therefrom which is hollowed out to form a bearing for the end of shaft 5. A small boss 6 is formed upon one side of the body member 1 and has a pair of openings therein for the reception of the pipes 7 and 8. A boss 9, on the cover 3, has a sleeve or bushing 10 therein which serves as a second bearing for the shaft 5. A larger opening in the upper end of this boss receives an oil seal 11 which prevents leakage of oil around the shaft 5. This seal 11 would serve the same purpose for other substances, if such were used in or forced through this structure. Gaskets 12 are located between the body 1 and the members 2 and 3 and therefore form tight joints between these parts to prevent leakage.

Figures 10, 11:
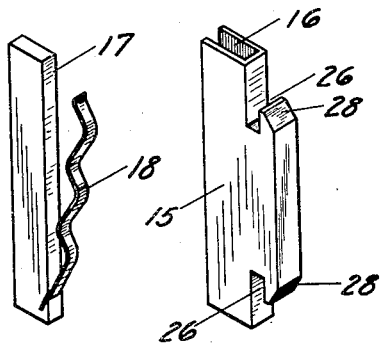
Fig. 10 is a perspective view of one of the elements of this construction.
Fig. 11 is a perspective view of another element of this construction which cooperates with the structure shown in Fig. 10.
Figure 4:
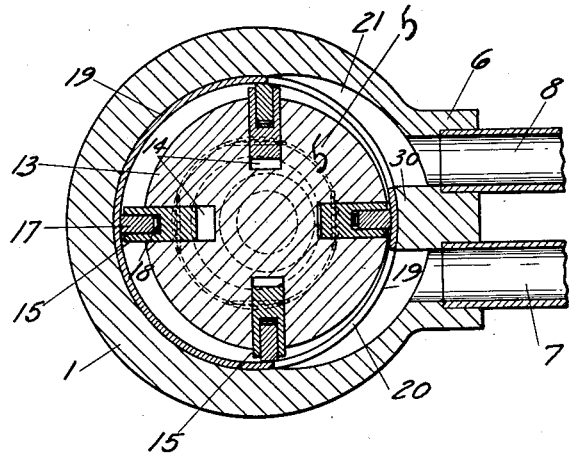
Fig. 4 is a transverse section taken substantially along the plane indicated by the line 4—4, Fig. 2.
Figures 5, 6:
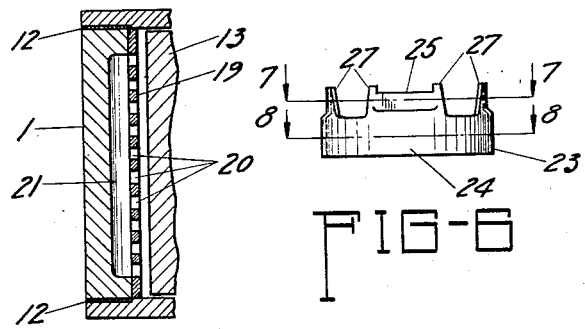
Fig. 5 is a fragmentary section taken substantially along the plane indicated by the line 5—5, Fig. 4.
Fig. 6 is an elevation of an element of this construction shown in longitudinal section in Fig. 2.

The shaft 5 has an enlargement 13 formed or mounted thereon within the body member 1. This enlargement 13 rotates within the opening within the body member 1 and has a series of slots 14 formed therein for the reception of blocks 15, shown clearly in Fig. 11. These blocks 15 are longitudinally slotted, as indicated at 16, for the reception of blades 17 having springs 18 secured to one edge, said springs being adapted to force the blades 17 out into contact with the bushing 19 which lines the cavity in the body member 1. As shown in Figs. 4 and 5, the sleeve or bushing 19 has slots 20 formed therein to permit the passage of fluid therethrough into the chamber 21 constituting an extension of the body chamber. The sleeve or bushing 19 serves as a wear member which prevents rubbing of the blades on the inside of the body member 1.

Figure 2:
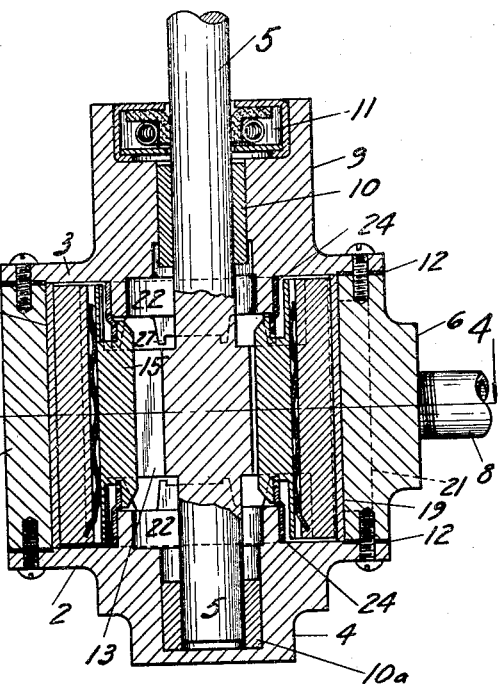
Fig. 2 is a longitudinal section through the structure shown in Fig. 1, substantially in the plane indicated by the line 2—2, Fig. 3.
Figure 3:
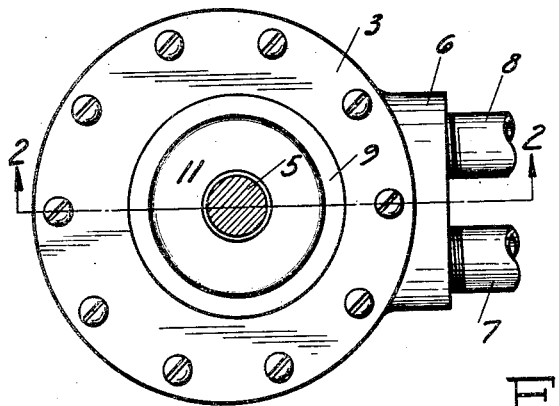
Fig. 3 is a plan view of the structure shown in Figs. 1 and 2.
Figure 7:
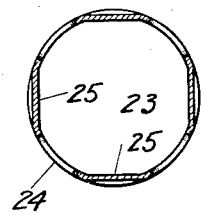
Fig. 7 is a transverse section of the structure shown in Fig. 6, the same being taken substantially along the plane indicated by the line 7—7 of that figure.
Figure 9:
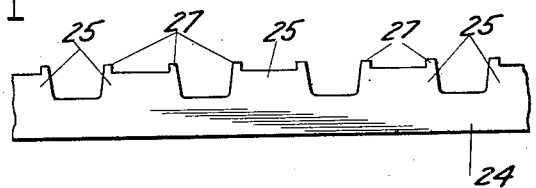
Fig. 9 is an elevation of the structure shown in Fig. 6 and representing the same as being opened up and flattened out.
Figure 8:
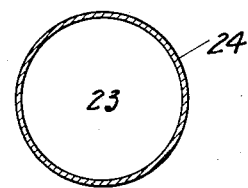
Fig. 8 is a transverse section taken substantially along the plane indicated by the line 8—8, Fig. 6.

Inwardly projecting flanges 22 are formed on the inner faces of the ends 2 and 3 to serve as guides about which the rings 23 rotate. These flanges 22, as will appear from Fig. 2, are eccentrically positioned with relation to the shaft 5. It will therefore be apparent that the rings 23 rotate eccentrically with relation to this shaft. It will be disclosed hereinafter how these rings are caused to rotate about the flanges 22 by this shaft. The rings 23 comprise a body portion 24 and projections 25 extending from one edge thereof. As is apparent from Figs. 6 and 7, these projections 25 are flattened, the flattened portions being received in the notches 26 of members 15. Each projection 25 has a pair of lugs 27 formed thereon, as indicated in Figs. 6 and 9.

As is apparent from Figs. 2 and 4, the blocks 15 fit in slots in the enlargement 13 of the shaft 5 and are slidable therein substantially radially thereof. As the shaft rotates rapidly, these blocks are forced outwardly by the centrifugal force due to the rotation and the projecting ends 28 engage the flattened parts 25 projecting from the ring 24. The lugs 27 project upwardly and downwardly upon opposite sides of the blocks 15 and the rings 24 are therefore caused to rotate with the blocks 15 and shaft 5. Since the flanges 22 are eccentrically positioned with relation to the shaft 5, the rings 24 will also be eccentrically positioned and this will result in the blocks 15 moving in and out during their rotation about the shaft. Inasmuch as the distance between the lugs 27 is greater than the thickness of the blocks 15, the latter are permitted to have a necessary freedom of motion due to the eccentric positioning of the parts. It is evident that the springs 18 will have a tendency to press outwardly upon the blades 17 and keep them out in engagement with the inner face of the bushing or shell 19. These springs also furnish any necessary resiliency so that if there is occasion for the blades to move inwardly toward the axis of the shaft 5 this will be entirely possible, though the blades will normally be held out in contact with the inner face of member 19. The member 30 which serves as a separator between the inlet and outlet may either be made integral with the surrounding shell or may be made separate and secured in place in the shell to prevent undesirable leakage between the inlet and outlet.

A bearing 10a, comparable to the bearing 10, surrounds the lower end of the shaft 5 and serves to properly position the shaft and reduce wear to a minimum. Since the flanges 22 serve to position the rings 24 and are arranged concentrically with respect to the bushing 19, it results that the blocks 15 are maintained at a constant distance from the bushing and a substantially constant tension is kept on springs 18 at all times, resulting in a constant pressure upon the inner wall of bushing 19. This reduces wear to a minimum.

By-passing of oil between the openings 14 in member 13 keeps a substantially constant volume of oil in these openings and therefore prevents pumping of oil into and out of the pump chamber to compensate for changing capacity thereof.

Instead of the flanges 22, eccentric bosses may be formed on the inner faces of the heads 2 and 3 and these will be formed with openings co-axial with and the same size as the openings receiving the bearings or sleeves 10 or 10a. This is scarcely a sufficiently different construction to be called a modification. Instead of using four blocks 15, I really prefer to use five equally spaced blocks.

It will of course be understood that the specific description of structure set forth herein may be departed from without departing from the spirit of my invention as set forth in this specification and the appended claim.

Having now described my invention, I claim:

A structure for the purpose indicated comprising a hollow body having a removable end, the ends of the body having inwardly projecting substantially cylindrical guiding members, a shaft journaled in the ends of the body and rotatable therein, said shaft having an enlargement within the body rotatable between the guiding members, said enlargement having longitudinal slots arranged around its periphery, blades in said slots and movable substantially radially with relation to the shaft, said blades contacting substantially constantly with the inner wall of the body, and rings engaging said guiding members and being rotatable with relation thereto, said rings having projections extending substantially parallel to the axis of the shaft, the projections being flattened into planes substantially parallel with the axis of the shaft, the flattened projections having spaced lugs to receive the ends of the blades between them, said rings engaging the blades and being caused by them to rotate about the cylindrical guiding members, the rings, while rotating, causing the blades to move inwardly and outwardly with relation to the axis of the shaft, and the flattened portions of the projections enabling the blades to shift laterally during rotation.

WILLIAM H. YANDELL.